(12) United States Patent
Gupta et al.

(10) Patent No.: US 7,905,548 B2
(45) Date of Patent: Mar. 15, 2011

(54) SPORTS VEHICLE SEAT WITH ADAPTIVE LATERAL RESTRAINTS

(75) Inventors: Gaurav Gupta, Guildford (GB); Raza Malik, San Jose, CA (US); Amedeo Visconti, Turin (IT); Roland Khayat, Broad Meadows (AU); Antonio Calvosa, Milan (IT); Paolo Gatto, Laval (CA)

(73) Assignee: Ferrari S.p.A., Modena (IT)

( * ) Notice: Subject to any disclaimer, the term of this patent is extended or adjusted under 35 U.S.C. 154(b) by 38 days.

(21) Appl. No.: 12/278,966

(22) PCT Filed: Feb. 9, 2007

(86) PCT No.: PCT/EP2007/051300
§ 371 (c)(1), (2), (4) Date: May 27, 2009

(87) PCT Pub. No.: WO2007/090898
PCT Pub. Date: Aug. 16, 2007

(65) Prior Publication Data
US 2009/0284059 A1      Nov. 19, 2009

(30) Foreign Application Priority Data
Feb. 10, 2006   (IT) ............................. BO2006A0090

(51) Int. Cl.
*B60N 2/42*  (2006.01)
(52) U.S. Cl. .................................. 297/284.9
(58) Field of Classification Search .............. 297/284.9
See application file for complete search history.

(56) References Cited

U.S. PATENT DOCUMENTS

| 4,655,505 | A | * | 4/1987 | Kashiwamura et al. ... 297/284.6 |
| 4,924,163 | A | * | 5/1990 | Sakamoto et al. ..... 297/284.9 X |
| 5,127,708 | A | * | 7/1992 | Kishi et al. ............. 297/284.9 X |
| 5,263,765 | A | * | 11/1993 | Nagashima et al. ... 297/284.9 X |
| 6,220,667 | B1 | * | 4/2001 | Wagner ................... 297/284.9 X |
| 6,746,078 | B2 | * | 6/2004 | Breed ....................... 297/216.12 |
| 6,824,212 | B2 | * | 11/2004 | Malsch et al. ........... 297/216.12 |
| 7,367,626 | B2 | * | 5/2008 | Lawall et al. ................. 297/410 |
| 7,708,343 | B2 | * | 5/2010 | Kayumi et al. ............ 297/284.9 |
| 2005/0206175 | A1 | | 9/2005 | Browne et al. |
| 2007/0057551 | A1 | * | 3/2007 | Lachenmann et al. ..... 297/284.9 |
| 2009/0218858 | A1 | * | 9/2009 | Lawall et al. .......... 297/284.9 X |

FOREIGN PATENT DOCUMENTS

| DE | 4008936 | 10/1990 |
| DE | 19649149 | 5/1998 |
| DE | 10211383 | 10/2003 |
| EP | 1063134 | 12/2000 |
| WO | 2005105516 | 11/2005 |

OTHER PUBLICATIONS

International Search Report for International Patent Application Serial No. PCT/EP2007/051300; Search Report Published: Jan. 10, 2008.

* cited by examiner

*Primary Examiner* — Rodney B White
(74) *Attorney, Agent, or Firm* — Bryan A. Santarelli; Graybeal Jackson LLP (57) ABSTRACT

An embodiment of a sports vehicle seat. The seat has lateral restraints for laterally retaining an occupant of the seat, and an actuating device for adapting the shape and/or size of the lateral restraints as a function of vehicle driving mode. Each lateral restraint incorporates at least one shape-memory member, which changes shape when subjected to physical external stress. And the actuating device subjects each shape-memory member to physical external stress to change the shape of the shape-memory member.

17 Claims, 7 Drawing Sheets

SPORTS VEHICLE SEAT WITH ADAPTIVE LATERAL RESTRAINTS

TECHNICAL FIELD

An embodiment of the present invention relates to a sports vehicle seat.

BACKGROUND

When cornering, a vehicle and the occupants are subjected to lateral (or centrifugal) acceleration directly proportional to the square of vehicle speed, and inversely proportional to the curve radius.

Lateral acceleration of an occupant of a vehicle when cornering results in a lateral force which tends to push the occupant out of the seat. Which is why vehicle seats normally provide for a certain degree of lateral restraint to counteract the lateral forces to which occupants are subjected when cornering.

When driving normally along public highways, vehicle speed, and therefore lateral acceleration when cornering, are relatively low, so that vehicle seats need only a minimum amount of lateral restraint to ensure adequate driving comfort of the occupants. Conversely, when racing on track or along highways closed off to the public, vehicle speed is high, so that lateral acceleration when cornering may reach extremely high levels (as much as 1 g in the case of sports cars). In which case, the seats offer a high degree of lateral restraint to prevent the occupants from being unseated when cornering. It should be pointed out that a seat with a high degree of lateral restraint serves not only to prevent undesired lateral movement of the driver when cornering, but also to transmit any lateral stress promptly to the driver's body, to enable the driver to "physically feel" the dynamic performance of the vehicle.

In the case of a sports vehicle that can be used both normally on public highways and on race tracks, a trade-off in terms of the degree of lateral restraint of the seats is inevitable. That is, it should not be so low as to penalize racing performance, but at the same time it should not be so high as to impair easy access to the seat portion of the seat during normal use. The compromise struck normally fails to achieve either. The only valid alternative is to have two sets of seats, one for normal use, and one for racing. Changing the seats, however, is a fairly long, painstaking job which calls for skilled labor, in that incorrect assembly may have serious consequences, particularly in the event of accidents.

Moreover, a seat with a high degree of lateral restraint fails to comfortably accommodate occupants of different build— and is therefore adapted to the build of the usual occupant— and makes entering and exiting the vehicle particularly awkward. These drawbacks are obviously routine in track racing, but are unacceptable during normal use of the vehicle.

German Patent Publication No. DE10211383, which is incorporated herein by reference, discloses a vehicle seat having a mechanical shaping mechanism, which comprises a memory metal and is controlled by an evaluation unit connected to force sensors arranged in the seat.

SUMMARY

An embodiment of the present invention is a sports vehicle seat which is cheap and easy to produce, while at the same time eliminating the aforementioned drawbacks.

BRIEF DESCRIPTION OF THE DRAWINGS

A number of non-limiting embodiments of the present invention will be described by way of example with reference to the accompanying drawings, in which.

DETAILED DESCRIPTION

Figure 1:
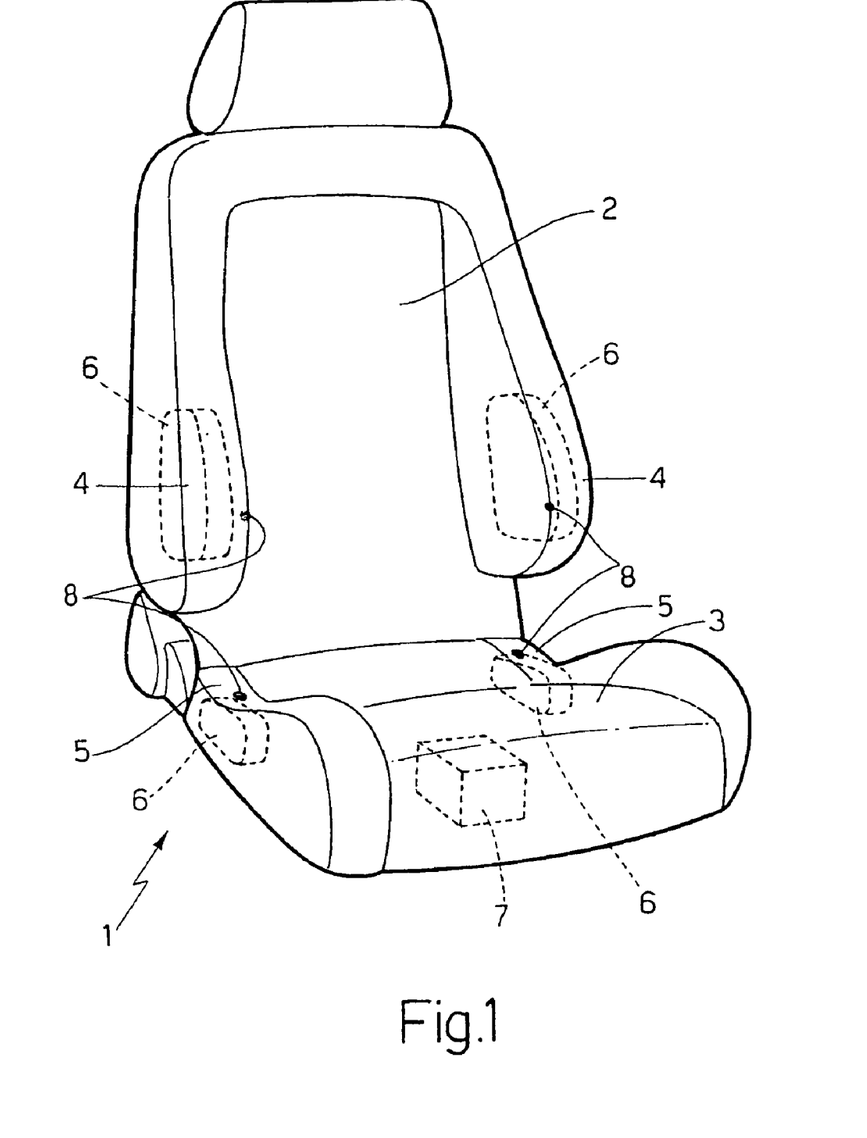
FIG. 1 shows a view in perspective of a sports vehicle seat in accordance with an embodiment of the present invention and in a comfort configuration.
Figure 2:
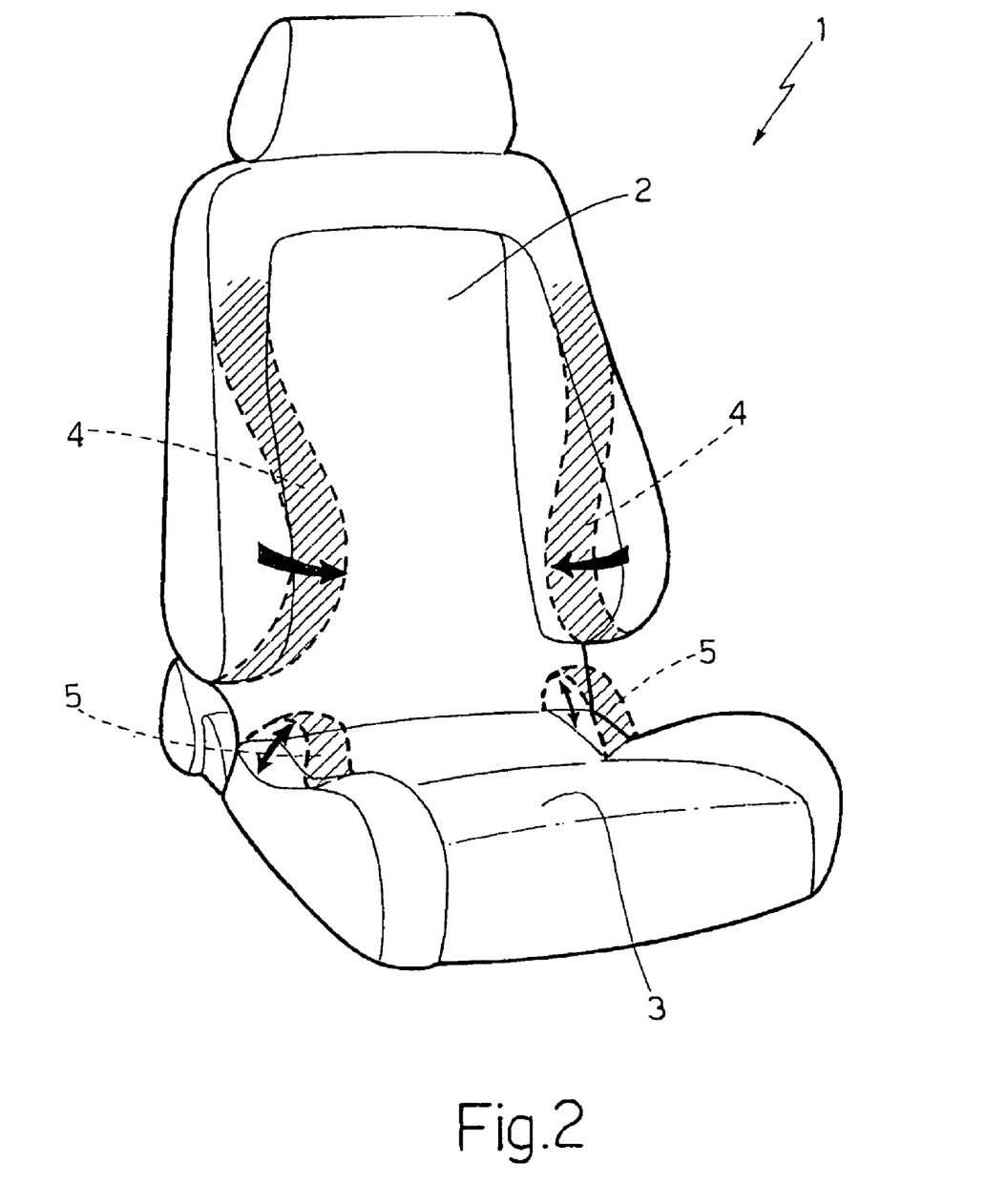
FIG. 2 shows a view in perspective of the FIG. 1 seat in a racing configuration.
Figure 3:
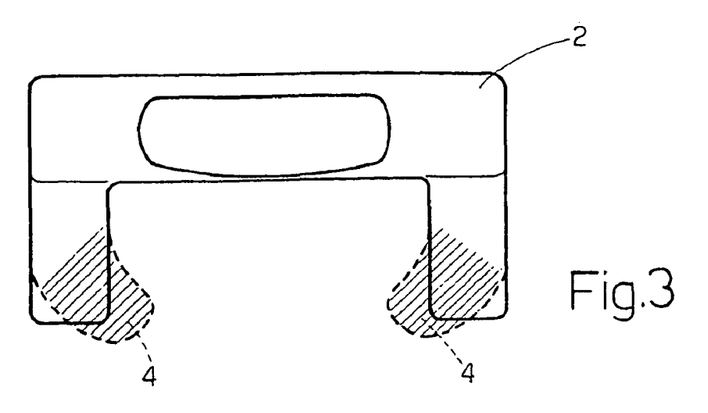
FIG. 3 shows a plan view of the seatback of the FIG. 1 seat in the racing configuration.
Figure 4:
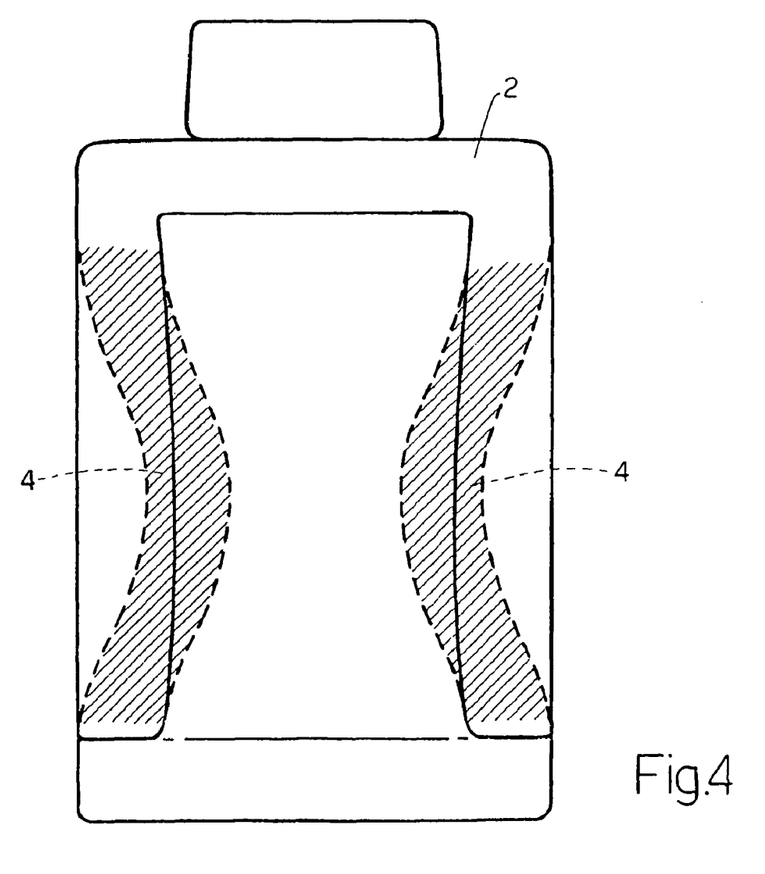
FIG. 4 shows a front view of the seatback of the FIG. 1 seat in the racing configuration.
Figure 5:
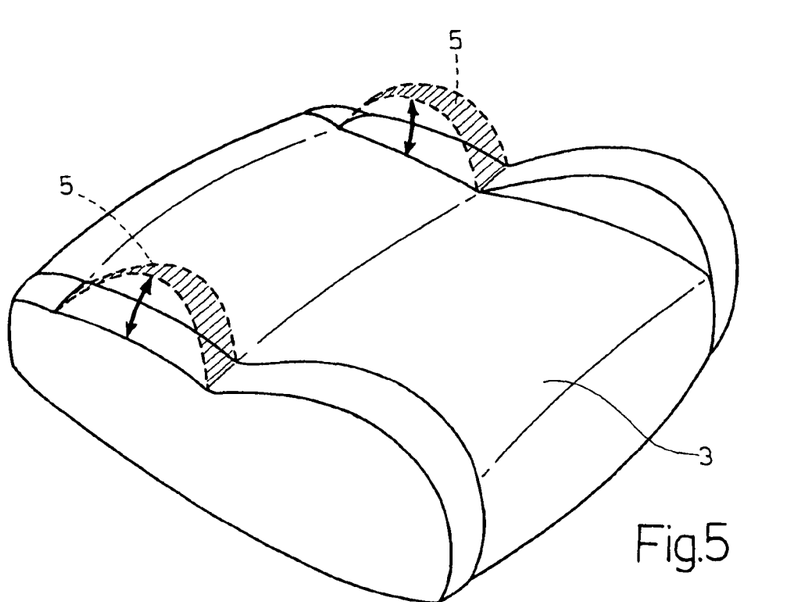
FIG. 5 shows a view in perspective of the seat portion of the FIG. 1 seat in the racing configuration.
Figure 6:
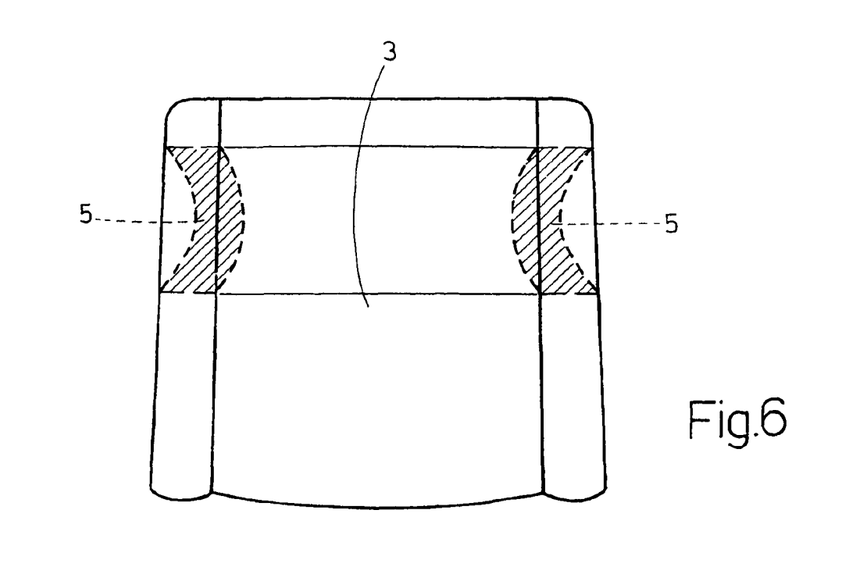
FIG. 6 shows a plan view of the seat portion of the FIG. 1 seat in the racing configuration.

Number 1 in FIG. 1 indicates as a whole a sports vehicle seat comprising a vertical seatback 2 and a horizontal seat portion 3. Seatback 2 comprises two lateral restraints 4, on opposite sides of seatback 2, for laterally retaining an occupant of the seat; and seat portion 3 comprises two lateral restraints 5, on opposite sides of seat portion 3, for laterally retaining an occupant of the seat.

Each lateral restraint 4, 5 incorporates at least one shape-memory member 6 (shown schematically in FIG. 1) which changes shape when subjected to physical external stress. By changing the shape of shape-memory members 6, the shape and/or size of lateral restraints 4 and 5 can therefore be altered to adapt the degree of lateral restraint provided by lateral restraints 4 and 5.

Seat 1 also comprises an actuating device 7 (shown schematically in FIG. 1) which applies physical external stress to each shape-memory member 6 to adapt the shape and/or size of lateral restraints 4 and 5 as a function of vehicle driving mode. In an embodiment, the physical external stress applied to shape-memory members 6 by actuating device 7 is heat generated by an electric current.

Figure 7:
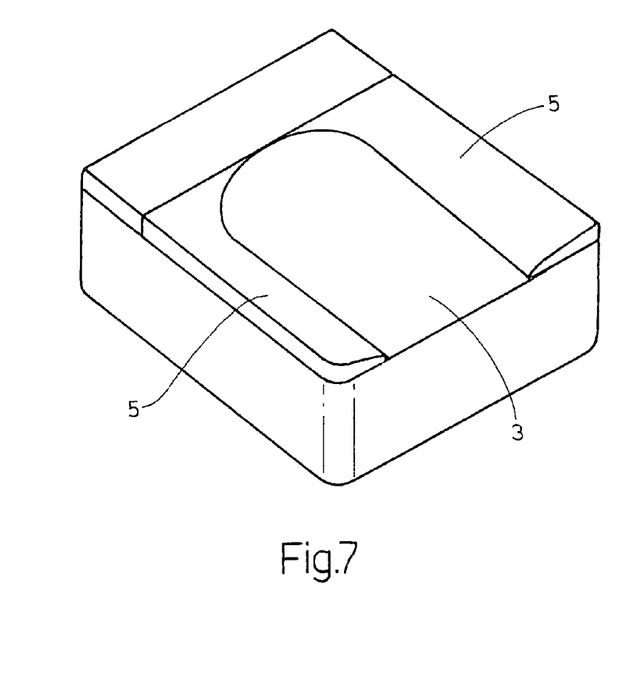
FIG. 7 shows a view in perspective of an alternative embodiment of the seat portion of the FIG. 1 seat in the comfort configuration.
Figure 8:
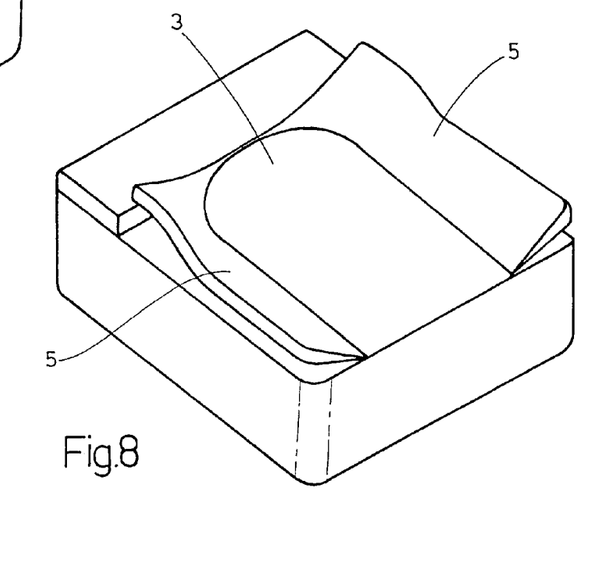
FIG. 8 shows a view in perspective of the FIG. 7 seat portion in the racing configuration.
Figures 9, 10:
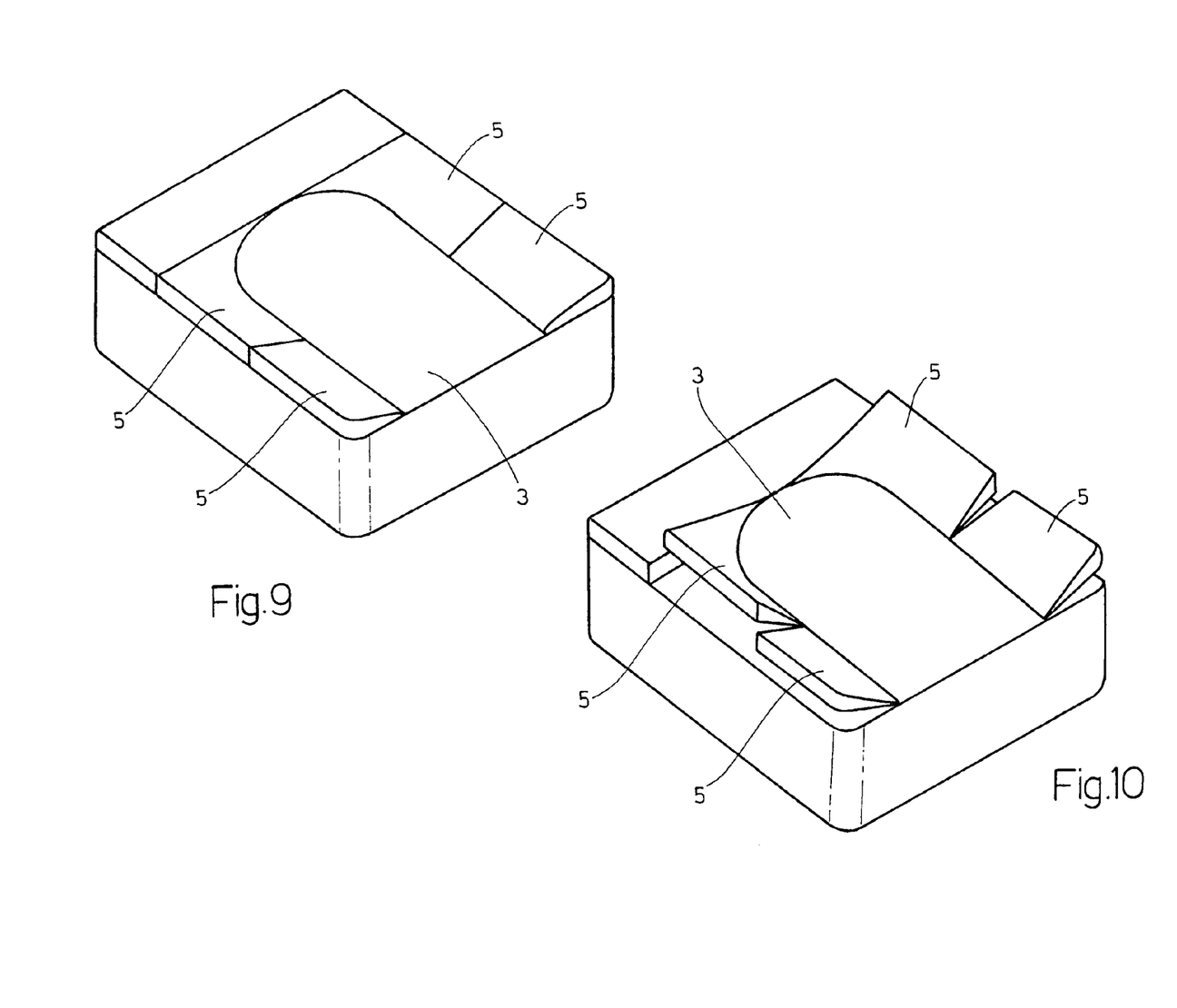
FIG. 9 shows a view in perspective of a further embodiment of the seat portion of the FIG. 1 seat in the comfort configuration.
FIG. 10 shows a view in perspective of the FIG. 9 seat portion in the racing configuration.

Under the control of actuating device 7, each lateral restraint 4, 5 may assume a comfort configuration characterized by a low degree of lateral restraint (as shown in FIGS. 1, 7, 9), and a racing configuration characterized by a high degree of lateral restraint (as shown in FIGS. 2-6, 8, 10). Each lateral restraint 4, 5 may also assume intermediate configurations between the comfort configuration and the racing configuration. In an alternative embodiment, each lateral restraint 4, 5 only assumes the comfort configuration or the racing configuration.

As shown in FIGS. 1 to 4, lateral restraints 4 of seatback 2 are positioned parallel to each other and perpendicular to seatback 2 in the comfort configuration, and deform, by increasing in volume and tilting towards each other, to grip the occupant of seat 1, when switching from the comfort configuration to the racing configuration.

As shown in FIGS. 1, 2, 5 and 6, lateral restraints 5 of seat portion 3 are withdrawn inside seat portion 3, with only a minimum part projecting vertically upwards from seat portion 3, in the comfort configuration, and deform, by increasing in volume and tilting towards each other, to grip the occupant of seat 1, when switching from the comfort configuration to the racing configuration. More specifically, lateral restraints 5 of seat portion 3 expand upwards and increase in volume, when switching from the comfort configuration to the racing configuration, so as to project upwards from seat portion 3.

In an alternative embodiment shown in FIGS. 7 to 10, lateral restraints 5 of seat portion 3 rotate towards the occupant of seat 1, when switching from the comfort configuration to the racing configuration. In the FIGS. 9 and 10 variation, each lateral restraint 5 of seat portion 3 is formed in two parts, which rotate by different angles when switching from the comfort configuration to the racing configuration.

In an embodiment, actuating device 7 comprises proximity or force sensors 8, each for determining the distance between at least one lateral restraint 4, 5 and the occupant of seat 1, so as to adapt the shape and/or size of lateral restraint 4, 5 to the actual size of the occupant. Two proximity sensors are embedded in lateral restraints 4 of seatback 2 to accurately adapt deformation of lateral restraints 4 to comfortably enclose the sides of the occupant of the seat with no cramping. Similarly, two proximity sensors are embedded in lateral restraints 5 of seat portion 3 to accurately adapt deformation of lateral restraints 5 to comfortably enclose the legs of the occupant of the seat with no cramping.

Figure 11:
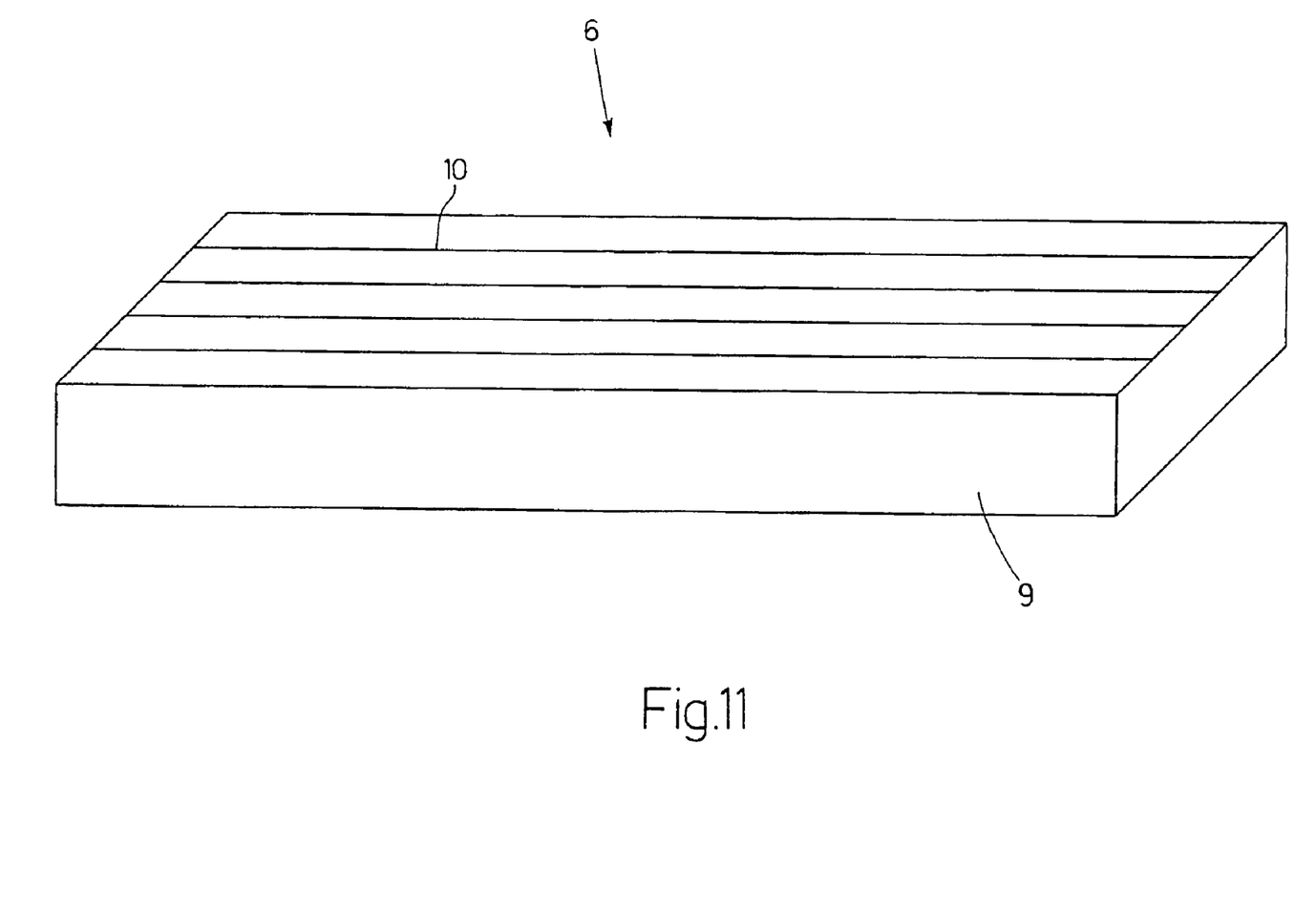
FIG. 11 shows schematically a view in perspective of a shape-memory member used in the FIG. 1 seat.

In an embodiment shown in FIG. 11, each shape-memory member 6 comprises a main body 9 made of a shape-memory polymer (SMP), which is rigid at low temperature, but becomes soft and rubbery (and therefore deformable) at high temperature (roughly over 25-40° C., depending on the type of polymer used). Each shape-memory member 6 also comprises a number of actuating wires 10 integrated in, close to a lateral wall of, main body 9, and made of a shape-memory alloy (SMA) which shortens above a given threshold temperature and lengthens again below the threshold temperature. A number of parallel, spaced actuating wires 10 may be provided.

Starting with a shape-memory member 6 with a rigid main body 9, main body 9 is heated until it becomes deformable; actuating wires 10 are then heated or cooled to produce a change in their length (shorten if heated, lengthen if cooled) and so deform main body 9; and, finally, main body 9 is cooled to become once more rigid and so stabilize the new shape.

In actual use, vehicle driving mode is determined, and actuating device 7 accordingly adapts the shape and/or size of lateral restraints 4 and 5. The degree of lateral restraint provided by lateral restraints 4 and 5 may thus be optimized at all times with respect to the vehicle driving mode, to achieve maximum comfort in normal driving mode, and maximum safety and driving performance in racing mode. In other words, the vehicle comprises a control unit which governs actuating device 7 to adapt the shape and/or size of lateral restraints 4 and 5 as a function of vehicle driving mode.

Vehicle driving mode may be determined manually, according to the setting of a driver-operated selector, or automatically by determining vehicle speed and/or longitudinal and lateral acceleration of the vehicle.

It should be pointed out that the shape, number, and location of lateral restraints 4 and 5 of seat 1 may differ for both aesthetic and functional reasons.

By adapting the degree of lateral restraint to vehicle driving mode, seat 1 as described above has numerous advantages, by providing a high degree of comfort in normal driving mode along public highways, as well as a high degree of safety and driving performance in track racing mode. Moreover, by virtue of sensors 8, the shape and/or size of lateral restraints 4 and 5 of seat 1 may be adapted to the actual build of the occupant of seat 1, which may therefore comfortably and safely accommodate occupants of widely differing build.

What is claimed is:

1. A sports vehicle seat; the seat comprises:
    a vertical seatback;
    a horizontal seat portion;
    lateral restraints for laterally retaining an occupant of the seat and having the shape and/or size which are/is adaptive to adapt the degree of lateral restraint provided by the lateral restraints; and
    an actuating device to adapt the shape and/or size of the lateral restraints as a function of vehicle driving mode so that each lateral restraint may assume a comfort configuration having a low degree of lateral restraint, and a racing configuration having a high degree of lateral restraint;
    wherein the seat portion comprises at least two first lateral restraints, which expand upwards when switching from the comfort configuration to the racing configuration; and
    wherein each lateral restraint incorporates at least one shape-memory member which changes shape when subjected to physical external stress; and the actuating device subjects each shape-memory member to physical external stress to change the shape of the shape-memory member.

2. A seat as claimed in claim 1, wherein the actuating device subjects each shape-memory member to electric heating of varying intensity.

3. A seat as claimed in claim 1, wherein each shape-memory member comprises a main body made of a shape-memory polymer; and a number of actuating wires integrated in the main body, close to a lateral wall of the main body, and made of a shape-memory alloy.

4. A seat as claimed in claim 3, wherein a shape-memory member comprises a number of parallel, spaced actuating wires.

5. A seat as claimed in claim 3, wherein, to change the shape of a shape-memory member, the main body is heated to become deformable, the actuating wires are heated or cooled to produce a change in their length and, so deform the main body, and the main body is cooled to become once more rigid and so stabilize the new shape.

6. A seat as claimed in claim 1, wherein each lateral restraint may assume intermediate configurations between the comfort configuration and the racing configuration.

7. A seat as claimed in claim 6, wherein two lateral restraints facing each other on opposite sides of the seat deform and tilt towards each other to grip the occupant, when switching from the comfort configuration to the racing configuration.

8. A seat as claimed in claim 7, wherein the seatback comprises at least two second lateral restraints, which deform and tilt towards each other to grip the occupant, when switching from the comfort configuration to the racing configuration.

9. A seat as claimed in claim 8, wherein the two second lateral restraints deform by tilting towards each other and increasing in volume, when switching from the comfort configuration to the racing configuration.

10. A seat as claimed in claim 1, wherein the two first lateral restraints deform by tilting towards each other to grip the occupant, when switching from the comfort configuration to the racing configuration.

11. A seat as claimed in claim 1, wherein the two first lateral restraints rotate towards the occupant when switching from the comfort configuration to the racing configuration.

12. A seat as claimed in claim 11, wherein each first lateral restraint is formed in at least two parts, which rotate by different angles when switching from the comfort configuration to the racing configuration.

13. A seat as claimed in claim 1, wherein the actuating device comprises at least one sensor for determining the distance between at least one lateral restraint and the occupant, so as to adapt the shape and/or size of the lateral restraint as a function of the actual size of the occupant.

14. A seat as claimed in claim 13, wherein the sensor is a proximity sensor.

15. A seat as claimed in claim 13, wherein the sensor is a force sensor.

16. A seat as claimed in claim 13, wherein the sensor is embedded in the lateral restraint.

17. A sports vehicle seat; the seat comprises:
a vertical seatback;
a horizontal seat portion;
lateral restraints for laterally retaining an occupant of the seat and having the shape and/or size which are/is adaptive to adapt the degree of lateral restraint provided by the lateral restraints; and
an actuating device to adapt the shape and/or size of the lateral restraints as a function of vehicle driving mode so that each lateral restraint may assume a comfort configuration characterized by a low degree of lateral restraint, and a racing configuration characterized by a high degree of lateral restraint;
wherein the seat portion comprises at least two first lateral restraints, which expand upwards when switching from the comfort configuration to the racing configuration;
wherein the two first lateral restraints rotate towards the occupant when switching from the comfort configuration to the racing configuration; and
wherein each first lateral restraint is formed in at least two parts, which rotate by different angles when switching from the comfort configuration to the racing configuration.

* * * * *